United States Patent [19]

Wasilczyk

[11] 4,108,791

[45] Aug. 22, 1978

[54] HIGH RESILIENCY POLYURETHANE FOAMS

[75] Inventor: George James Wasilczyk, Lake Jackson, Tex.

[73] Assignee: The Dow Chemical Company, Midland, Mich.

[21] Appl. No.: 763,953

[22] Filed: Jan. 31, 1977

[51] Int. Cl.$^2$ ............................ C08K 9/02; C08K 3/36
[52] U.S. Cl. ................................ 252/182; 260/40 TN; 260/42.15; 260/42.44; 521/122; 521/99; 521/90 K
[58] Field of Search ................. 252/182; 260/2.5 AK, 260/2.5 AP, 2.5 AQ, 2.5 AR, 2.5 AS, 40 TN, 42.15, 42.44

[56] References Cited

U.S. PATENT DOCUMENTS

| | | | |
|---|---|---|---|
| 3,004,921 | 10/1961 | Stossel | 252/309 |
| 3,567,574 | 3/1971 | Braitberg et al. | 252/358 |
| 3,716,502 | 2/1973 | Loew | 260/2.5 AK |
| 3,753,933 | 8/1973 | Olstowski et al. | 260/2.5 AK |
| 3,945,939 | 3/1976 | Barron | 252/182 |
| 3,954,650 | 5/1976 | Bliss | 252/182 |
| 4,042,536 | 8/1977 | Dieterich et al. | 260/2.5 AK |

*Primary Examiner*—Benjamin R. Padgett
*Assistant Examiner*—Irwin Gluck
*Attorney, Agent, or Firm*—J. G. Carter

[57] ABSTRACT

Flexible polyurethane foams are prepared from polyols containing 0.1 to 5.0 percent by weight of an inorganic filler such as fumed silica having a pH value of 6-8.5 and an effective particle size of less than 7 microns. Foams molded from such polyols exhibit in some instances an improvement in some of the strength properties and do not alter substantially, the mold fill time. In addition, there is an improvement in foam porosity (air flow) as well as a reduction in the force required to crush foam articles.

4 Claims, No Drawings

HIGH RESILIENCY POLYURETHANE FOAMS

The present invention is directed to flexible polyurethane foams containing inorganic fillers, a process for their preparation and to polyols containing inorganic fillers.

Polyurethane foams have been prepared which contain inorganic fillers such as are disclosed in British Pat. No. 1,093,173 and U.S. Pat. Nos. 3,298,976; 3,441,523 and 3,150,109. Of the above mentioned patents, only one mentions a treated inorganic filler. In U.S. Pat. No. 3,150,109, an inorganic filler is treated, for example, with an alkanol amine. When such treated fillers are employed in place of the fillers described in the present invention the resultant foam has certain deficiencies such as, for example, rapidly rising foam results in decreased time available to close and secure the mold lid, often resulting in excessive extrusion of foam. This extrusion reflects an economic loss, and may also result in partial or complete collapse of the foam part. An additional disadvantage in using this approach is a result of rapid gellation, causing poor reproduction of intricate mold designs. Typically, these systems result in foam with many closed cells that is difficult to remove from the mold and difficult to crush. Irreversible foam shrinkage often results, thereby producing an unacceptable part.

It has now been discovered that these deficiencies can be overcome by the use of the inorganic fillers described herein.

The present invention is therefore directed to flexible polyurethane resulting from subjecting to foaming conditions a composition which comprises (A) a polyol composition consisting essentially of
  (1) from about 50 to 100 and preferably from about 75 to 100 parts by weight of a primary hydroxyl-containing polyether triol having an average hydroxyl equivalent weight of from about 900 to about 2500;
  (2) from 0 to about 50 and preferably from 0 to about 25 parts by weight of a diol, a triol, or mixtures thereof wherein said polyols have an average hydroxyl equivalent weight of from about 900 to about 2500 and preferably from about 1000 to about 2000;
(B) an organic polyisocyanate consisting of
  (1) from about 50 to about 100% and preferably from about 75 to 100% by weight of 2,4-toluene diisocyanate, 2,6-toluene diisocyanate, NCO-containing prepolymers thereof, or mixtures thereof, and
  (2) from 0 to about 50% and preferably from about 0 to 25% by weight of an organic polyisocyanate having an average functionality of at least 2;
(C) from about 0.1 to about 5.0, preferably from about 0.30 to about 0.75 parts per 100 parts by weight of Component (A) of an inorganic filler having a pH of from about 6.5 to about 8.5, preferably from about 7 to about 8 and an effective particle size of less than about 7 microns, preferably less than about 2.5 microns wherein the effective particle size is the ultimate size of the particle or the size of particle agglomerates whichever is larger;
(D) from about 1.0 to about 5 and preferably from about 2.0 to about 3.0 parts of water per 100 parts by weight of Component (A);
(E) from 0 to about 20 and preferably from about 5 to about 10 parts of a low boiling auxiliary blowing agent per 100 parts by weight of Component (A);
(F) from about 0 to about 10 and preferably from about 3 to about 5 parts of a crosslinker component per 100 parts by weight of Component (A);
(G) from about 0.5 to about 4 and preferably from about 0.7 to about 1.5 parts of a catalyst for urethane formation per 100 parts by weight of Component (A);
(H) from about 0.005 to about 2.5 and preferably from about 0.03 to about 0.05 parts of a silicone oil cell control agent per 100 parts by weight of Component (A);

wherein Components (A), (B), (D) and (F) are present in quantities so as to provide an NCO:active hydrogen equivalent ratio of from about 0.8:1.0 to about 1.3:1.0 and preferably from about 0.9:1.0 to about 1.1:1.0.

The present invention is also directed to an improved process for preparing flexible polyurethane foams by reacting a polyol and a polyisocyanate under foam forming conditions wherein said improvement comprises employing an inorganic filler having a pH of from about 6.5 to about 8.5 and an average effective particle size of from about 0.5 to about 7 microns.

The present invention is further directed to a polyol containing from about 0.25 to about 10.0, preferably from about 2.5 to about 3.5 percent by weight of an inorganic filler having a pH from about 6.5 to about 8, preferably from about 7 to about 8 and an effective particle size of from about 0.5 to about 7, preferably from about 1 to about 2.5 microns.

Suitable primary-hydroxyl containing triols which may be suitably employed as Component (A-1) include the reaction products of glycerine, trimethylolpropane, hexane triol, mixtures thereof or the like, with a vicinal alkylene oxide having from 2 to about 4 carbon atoms such as, for example, ethylene oxide, 1,2-propylene oxide, 1,2-butylene oxide, 2,3-butylene oxide or a mixture of such alkylene oxides and subsequently endcapping the resultant polyol with at least 1 mole of ethylene oxide per hydroxyl group and wherein the resultant end-capped triols has an average hydroxyl equivalent weight of from about 900 to about 2500 and preferably from about 1200 to about 2000. The primary-hydroxyl containing polyether polyol usually contains from about 5 to about 20% by weight of ethylene oxide on the end of the molecule.

Suitable diols and triols which may be employed as Component (A-2) include those prepared by the reaction of a compound containing 2 or 3 active hydrogen groups such as, for example, water, ethylene glycol, propylene glycol, 1,4-butane diol, 1,6-hexane diol, glycerine, trimethylol propane, mixtures thereof and the like with a vicinal epoxy compound such as ethylene oxide, 1,2-propylene oxide, 1,2-butylene oxide, 2,3-butylene oxide, styrene oxide, mixtures thereof and the like and which have an average hydroxyl equivalent weight of from about 900 to about 2500 and preferably from about 1000 to about 2000. Also suitable are the polyester diols having an average hydroxyl equivalent weight of from about 900 to about 2500 and preferably from about 1000 to about 2000.

Also included are such diols and triols as discussed above which contain polymers of ethylenically unsaturated monomers. Suitable such polyols are described in U.S. Pat. Nos. 3,383,351; 3,652,639; 3,823,201; 3,953,393 and 3,869,413. These patents are incorporated herein by reference.

Suitable organic polyisocyanates which may be employed in admixture with the toluene diisocyanate or prepolymers thereof include any such isocyanate which does not contain a substituent group which is capable of reacting with the polyether triol. Suitable such isocyanates include polymethylene polyphenylisocyanate
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
isophoronediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether
4,4'-diphenylmethane diisocyanate
benzidinediisocyanate,
4,6-dimethyl-1,3-phenylenediisocyanate,
4,4'-diisocyanatodibenzyl,
9,10-anthracenediisocyanate,
3,3'-dimethyl-4,4'-diisocyanatodiphenylmethane,
2,6'-dimethyl-4,4'-diisocyanatodiphenylmethane,
2,4-diisocyanatostilbene,
1,4-anthracenediisocyanate,
2,5-fluorenediisocyanate,
1,8-naphthalenediisocyanate,
2,4,6-toluenetriisocyanate, and
2,4,4'-triisocyanatodiphenylether, crude or undistilled isocyanates, dimers or trimers of toluene diisocyanates.

Other organic polyisocyanates that can be used are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

Suitable NCO-containing prepolymers of 2,4- and 2,6-toluenediisocyanate which can be employed as the polyisocyanate component (B-1) includes those prepared by reacting an excess of the toluenediisocyanate with a substance having from 2 to about 4 active hydrogen atoms and an active hydrogen equivalent weight of from about 30 to about 2500, preferably from about 30 to about 300.

Suitable such active hydrogen-containing substances include for example, ethylene diamine, ammonia, methyl amine, aminoethylethanol amine, propylene diamine, ethylene glycol, propylene glycol, butylene glycol, hexane diol, pentanediol, bisphenols, halogen substituted bisphenols, neopentyl glycol, halogenated neopentyl glycol, adducts of such active hydrogen-containing substances and vic-epoxy-containing compounds such as for example, ethylene oxide, propylene oxide, 1,2-butylene oxide, 2,3-butylene oxide, styrene oxide, epichlorohydrin, epibromohydrin, phenyl glycidyl ether, butyl glycidyl ether, dibromophenyl glycidyl ether, mixtures thereof and the like.

It is preferred that the NCO-containing prepolymer contain from about 10 to about 45% free NCO groups by weight.

It should be understood that in the preparation of prepolymers from an excess of the toluene diisocyanate, that the resultant product will usually contain some unreacted toluene diisocyanate.

Suitable inorganic fillers which may be employed herein as Component (C) include fumed or colloidal silica, amorphous silica, carbon black, aluminum silicate, calcium carbonate, barium sulfate, kaolin, cadmium selenide, titanium dioxide, aluminum trihydrate, mica, iron oxides and inorganic precipitates or coprecipitates. Mixtures of these and equivalent substances are contemplated also.

Such fillers can be prepared by treating commercially available materials having the claimed particle size but a pH lower than 6.5 with a suitable base such as ammonia, sodium hydroxide, potassium hydroxide and the like or by steam stripping to remove excess acidic components, or by coating the particles such that contaminants would be physically included. Commercially available materials having the claimed particle size but a pH greater than 8.5 can be similarly treated with a suitable acid and/or steam stripped, or coated.

Suitable crosslinker compounds which may be employed herein as Component (F) include, for example, tris (polyoxyalkylene alkanol)amines; mono-, di- and tri-isopropanol amines; oxydianiline; vicinal hydroxy amines containing at least 4 carbon atoms; mono-, di-, and triethanol amines; an aliphatic diol or a polyether diol, said diols having an OH equivalent weight of less than about 300 and preferably less than about 200; isophorone diamine; menthane diamine and oxyhydrocarbon or oxyhydrocarboxy derivatives of isocyanuric acid or aryl substituted isocyanuric acid.

Suitable oxyhydrocarbon or oxyhydrocarboxy derivatives of isocyanuric acid or aryl substituted isocyanuric acid which may be employed herein are those represented by the general formula

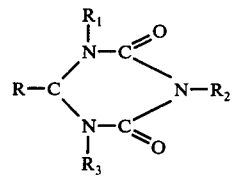

wherein R is =O or a member of the group represented by the formula

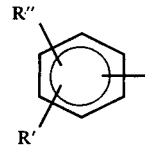

wherein each R' and R" are independently hydrogen, Cl, Br, OH or an alkyl group having from 1 to about 6 carbon atoms, each $R_1$, $R_2$, and $R_3$ is independently selected from the formulas

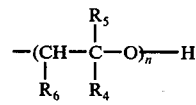

wherein each $R_4$ is independently hydrogen, phenyl, methyl, ethyl or halomethyl, each $R_5$ and $R_6$ are independently hydrogen or methyl with the proviso that only one of such groups can be a methyl group, each $n$ is independently 0, 1, 2, or 3; and

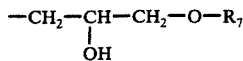

wherein $R_7$ is selected from the group consisting of allyl, methallyl, an aryl group, a haloaryl group, a dihaloaryl group or an alkaryl group said aryl, haloaryl, dihaloaryl and alkaryl groups being represented by the formula

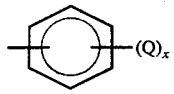

wherein Q is a halogen or an alkyl group and $x$ has a value of 1 when Q is an alkyl group and a value of 1 or 2 when Q is a halogen or $x$ has a value of 0; with the proviso that no more than 2 of the $R_1$, $R_2$ and $R_3$ groups can be represented by the formula

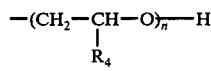

when $R_4$ is hydrogen, methyl or halomethyl.

Suitable such crosslinkers and a method for their preparation can be found in U.S. Pat. No. 3,907,721 which is incorporated herein by reference.

Suitable tris(polyoxyalkylene alkanol) amines which may be employed herein include those represented by the formula

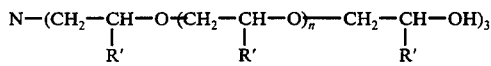

wherein each $R'$ is independently hydrogen, methyl or ethyl, and each $n$ has an average value of from 0 to about 5. The substances represented by the above formula are readily prepared by the condensation of ammonia with an alkylene oxide such as ethylene oxide, 1,2-propylene oxide, 1,2-butylene oxide, 1,2-isobutylene oxide, or mixtures thereof. The products of the condensation reaction are most generally a mixture of products, wherein the components of the mixture can be, if desired, separated by distillation or other suitable means or the mixture itself can be employed as an auxiliary crosslinker.

Suitable vicinal hydroxyl amine compounds containing at least 4 carbon atoms which can be employed herein include, for example, those represented by the general formulas

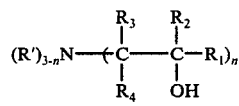

wherein $R_1$, $R_2$, $R_3$ and $R_4$ are independently hydrogen, an alkyl group having from 1 to about 10 carbon atoms, or a —C—O—$R_5$ group wherein $R_5$ is an aliphatic hydrocarbon group having from 1 to about 10 carbon atoms, a phenyl group, a one to four carbon alkyl substituted phenyl group, or a mono or dihalo substituted phenyl group, $R'$ is hydrogen, an aliphatic hydrocarbon group having from 1 to about 10 carbon atoms, a hydroxy alkyl group having from 1 to about 10 carbon atoms or a phenyl group and wherein $n$ has a value of 1 to 3 inclusive, with the proviso that the sum of the carbon atoms contained in the $R_1$, $R_2$, $R_3$ and $R_4$ groups is at least 2.

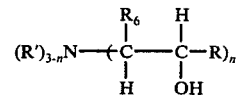

wherein R and $R_6$ collectively represent a divalent 3 to 6 carbon atom saturated or unsaturated hydrocarbon group thereby forming a 5 to 8 membered ring and wherein $R'$ and $n$ are as defined in formula I above.

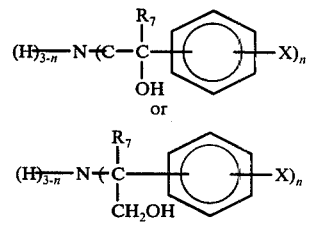

wherein each $R_7$ is independently hydrogen or an alkyl group having from 1–4 carbon atoms, each X is independently hydrogen, chlorine, bromine or an alkyl group having from 1–4 carbon atoms and $n$ has a value of from 1 to 3 inclusive.

Suitable vicinal hydroxyl amine compounds include, for example, 1-amino-2-hydroxybutane, bis(2-hydroxybutyl) amine, tris(2-hydroxybutyl)amine, 3-phenoxy-2-hydroxypropylamine, 2-phenyl-2-hydroxyethylamine, 1-amino-2-hydroxycyclopentane, 2-hydroxypropyl-N-phenylamine, 2-hydroxyethyl-N-phenylamine, 3-phenoxy-2-hydroxypropyl-N-phenylamine, 2-hydroxybutyl-N-phenylamine, bis(3-phenoxy-2-hydroxypropyl) amine, 2-hydroxyethyl-N-(3-phenoxy-2-hydroxypropyl)amine, 1-amino-1-hydroxy-cyclohexane, 1-amino-2-hydroxycyclooctane, 2-hydroxyethyl-N-(2-hydroxybutyl)amine.

The vicinal hydroxyl amine compounds are readily prepared by reacting ammonia, a primary or secondary amine or a primary or secondary hydroxyl amine with a vicinal epoxy-containing compound employing known procedures.

Suitable aliphatic diols which may be employed as a crosslinker herein include, for example, ethylene glycol, diethylene glycol, propylene glycol, dipropylene glycol, 1,2-butane diol, 1,3-butane diol, 1,4-butane diol, mixtures thereof and the like.

Suitable polyether diols which may be employed as a crosslinker herein include, for example, polyoxyethylene glycols, polyoxypropylene glycols, polyoxybutylene glycols, mixtures thereof and the like.

suitable silicone oils include polymers of dimethyl siloxane having a viscosity at 77° C of 5 centistokes or other silicone oils which are commercially available.

Suitable auxiliary blowing agents include aliphatic hydrocarbons boiling below 110° C or halogenated aliphatic hydrocarbons boiling below 110° C such as dichlorodifluoromethane, trichlorofluoromethane, hexane, hexene, or pentane as the blowing or foaming agent. Suitable foaming agents are disclosed in U.S. Pat. No. 3,072,582.

Suitable tertiary amine catalysts which may be employed as Component (G) include, for example, triethylenediamine, N-ethylmorpholine, N(dimethylaminoethyl)piperazine, N,N'-bis(dimethylaminoethyl) piperazine, tetramethyl butanediamine, dimethylethanolamine, bis(2-dimethylaminomethyl) ether, mixtures thereof and the like.

Organometal catalysts such as stannous octoate, dibutyltindilaurate and the like may also be employed either alone or together with the tertiary amine catalysts if desired.

Other suitable catalysts which may be employed as Component (G) include trimethylaminoethyl piperzine, N(dimethylaminoethyl)-N'-methylpiperazine, N-ethyl diethanol amine, N,N-dibutyl isopropanol amine, N-phenyl ethanolamine, N,N-phenyl ethyl ethanolamine, N,N-diisopropyl ethanolamine, tris(N,N-dimethyl-2-aminoethyl)amine, and N,N'-tetramethyl-1,3-diamino-2-propanol.

Agents for supressing flammability characteristics such as for example, tris(2,3-dibromopropyl)phosphate; tris(2-chloroethyl)phosphate; tris(dichloropropyl)phosphate; triethylphosphate; mixtures thereof and the like may also be employed in the foams of the present invention.

The following examples are illustrative of the present invention, but are not to be construed as to limiting the scope thereof in any manner.

EXAMPLE 1–13 AND COMPARATIVE EXPERIMENTS A-G

A. Preparation of Treated Inorganic Filler 100 grams of a colloidal silica having a pH of 5.5 and an average effective particle size of less than 2 microns (commercially available from Cabot Corp. as Cab-O-Sil Grade M-5) was placed in a polyethylene bag which was then filled with anhydrous ammonia. The silica was maintained under the ammonia atmosphere until the silica had a pH of 6.5–7.5.

B. Preparation of Polyol Containing Inorganic Filler

A suspension of inorganic filler in a polyol was prepared by mixing 40 grams of the inorganic filler from A above with 1960 grams of a polyether triol prepared from glycerine and propylene oxide containing an endcap of about 15% by weight of ethylene oxide and having an OH equivalent weight of about 1600 (Polyol A).

C. Preparation of Silica Coated with Triethanol Amine 20 grams of triethanolamine was added to 180 grams of distilled water. 100 grams of Grade M-5 Cab-O-Sil available from Cabot Corp. was slurried with the aqueous amine alcohol solution. The slurry was dried until there was less than about 1 percent free moisture. The resultant material was ball milled to regain the form of fine particles. The average effective particle size was less than 2 microns.

D. Preparation of Foams

Polyurethane foams were prepared at various levels of the treated silica by blending the polyol from B containing the silica with additional quantities of Polyol A to achieve the desired level of filler. Foams were also prepared from Polyol A containing untreated silica as well as from Polyol A containing no silica and a silica treated with triethanol amine. The composition and properties of the foams are given in the following Table I. All quantities indicated are parts by weight.

TABLE I

| | Example 1 | Comp. Exp. A | Comp. Exp. B | Comp. Exp. C | Comp. Exp. D | Example 2 | Example 3 |
|---|---|---|---|---|---|---|---|
| Polyol A | 100 | 100 | 100 | 100 | 100 | 100 | 100 |
| filler | 0.25[1] | 0.25[2] | — | 0.25[8] | 0.25[12] | 0.5[1] | 1.0[1] |
| isophorone diamine | 0.6 | 0.6 | 0.6 | 0.6 | 0.6 | 0.6 | 0.6 |
| diethanolamine | — | — | — | — | — | — | — |
| water | 2.5 | 2.5 | 2.5 | 2.5 | 2.5 | 2.5 | 2.5 |
| silicone cell control agent | 2.0[7] | 2.0[7] | 2.0[7] | 2.0[7] | 2.0[7] | 2.0[7] | 2.0[7] |
| triethylenediamine[3] | 0.21 | 0.21 | 0.21 | 0.21 | 0.21 | 0.21 | 0.21 |
| bis(2-dimethyl-aminoethyl ether[4] | 0.15 | 0.15 | 0.15 | 0.15 | 0.15 | 0.15 | 0.15 |
| DMP + MEE[6] | 0.3 | 0.3 | 0.3 | 0.3 | 0.3 | 0.3 | 0.3 |
| dibutyl tin dilaurate | 0.01 | 0.01 | 0.01 | 0.01 | 0.01 | 0.01 | 0.01 |
| zinc octoate | 0.05 | 0.05 | 0.05 | 0.05 | 0.05 | 0.05 | 0.05 |
| Isocyanate | 33.5[5] | 33.5[5] | 33.5[5] | 33.5[5] | 33.5[5] | 33.5[5] | 33.5[5] |
| NCO Index | 105 | 105 | 105 | 105 | 105 | 105 | 105 |
| Mold fill time, sec. | 61 | 72 | 61 | 50 | 62 | 61 | 61 |
| Density, lbs/ft$^3$ (g/cc) | 2.83 (0.045) | 2.75 (0.044) | 2.79 (0.045) | 2.43 (0.039) | 2.78 (0.045) | 2.71 (0.043) | 2.76 (0.044) |
| Tensile strength, psi (kg/cm$^2$) | 18.7 (1.31) | 14.7 (1.03) | 16.2 (1.14) | 13.3 (0.93) | 15.3 (1.08) | 18.6 (1.31) | 22.7 (1.6) |
| Tear resistance, lbs/in (kg/cm) | 1.97 (0.352) | 1.84 (0.329) | 1.93 (0.345) | 1.82 (0.325) | 1.82 (0.325) | 2.07 (0.37) | 2.7 (0.482) |
| Resiliency (D.B.) | 57 | 52 | 59 | 65 | 57 | 63 | 62 |
| 25% ILD | 30 | 26 | 32.5 | 28.8 | 33.6 | 31.2 | 31.6 |
| 65% ILD | 84.2 | 65.4 | 82.6 | 84 | 83 | 80.4 | 82.0 |
| Modulus | 2.81 | 2.52 | 2.54 | 2.92 | 2.55 | 2.58 | 2.59 |
| Air Flow, ft$^3$/min. (m$^3$/min.) | 1.0 (0.028) | 0.5 (0.014) | 1.0 (0.028) | 1.1 (0.031) | 0.5 (0.014) | 1.2 (0.034) | 2.2 (0.062) |
| % Shrinkage | 8.44 | 10.23 | 15.36 | 16.14 | 14.22 | 2.22 | 2.04 |

| | Example 4 | Example 5 | Example 6 | Example 7 | Example 8 | Example 9 |
|---|---|---|---|---|---|---|
| Polyol A | 100 | 100 | 100 | 100 | 100 | 100 |
| filler | 0.15[1] | 0.25[1] | 0.50[1] | 0.75[1] | 1.0[1] | 1.5[1] |
| isophorone diamine | 0.6 | 0.6 | 0.6 | 0.6 | 0.6 | 0.6 |
| diethanolamine | — | — | — | — | — | — |
| water | 2.5 | 2.5 | 2.5 | 2.5 | 2.5 | 2.5 |
| silicone cell control agent | 2.0[7] | 2.0[7] | 2.0[7] | 2.0[7] | 2.0[7] | 2.0[7] |
| triethylenediamine[3] | 0.21 | 0.21 | 0.21 | 0.21 | 0.21 | 0.21 |

TABLE I-continued

| | | | | | | |
|---|---|---|---|---|---|---|
| bis(2-dimethyl-amino ethyl) ether[4] | 0.13 | 0.13 | 0.13 | 0.13 | 0.13 | 0.13 |
| DMP + MEE[6] | 0.3 | 0.3 | 0.3 | 0.3 | 0.3 | 0.3 |
| dibutyl tin dilaurate | 0.01 | 0.01 | 0.01 | 0.01 | 0.01 | 0.01 |
| zinc octoate | 0.05 | 0.05 | 0.05 | 0.05 | 0.05 | 0.05 |
| isocyanate | 33.5[5] | 33.5[5] | 33.5[5] | 33.5[5] | 33.5[5] | 33.5[5] |
| NCO Index | 105 | 105 | 105 | 105 | 105 | 105 |
| Density, lbs/ft$^3$ | 2.79 | 2.83 | 2.71 | 2.76 | 2.70 | 2.86 |
| (g/cc) | (0.045) | (0.045) | (0.043) | (0.044) | (0.043) | (0.046) |
| Tensile strenght, psi | 16.9 | 18.7 | 18.6 | 22.7 | 22.9 | 23.2 |
| (kg/cm$^2$) | (1.19) | (1.31) | (1.31) | (1.6) | (1.61) | (1.63) |
| Tear resistance, lbs/in | 1.95 | 1.97 | 2.07 | 2.7 | 2.27 | 2.41 |
| (kg/cm) | (0.35) | (0.35) | (0.37) | (0.48) | (0.41) | (0.43) |
| Resiliency (D.B.) | 59 | 57 | 63 | 62 | 61 | 62 |
| 25% ILD | 30.8 | 30 | 31.2 | 31.6 | 29.8 | 31.2 |
| 65% ILD | 82.4 | 84.2 | 80.4 | 82.0 | 83.0 | 81.4 |
| Modulus | 2.68 | 2.81 | 2.58 | 2.59 | 2.79 | 2.61 |
| Air Flow, ft$^3$/min. | 1.0 | 1.0 | 1.2 | 2.2 | 2.6 | 2.9 |
| (m$^3$/min.) | (0.03) | (0.03) | (0.03) | (0.06) | (0.07) | (0.08) |
| % Shrinkage | 12.68 | 8.44 | 2.22 | 2.02 | 2.04 | 2.1 |

| | Example 10 | Comp. Exp. E | Example 11 |
|---|---|---|---|
| Polyol A | 100 | 100 | 100 |
| filler | 1.75[1] | — | 10[11] |
| isophorone diamine | 0.6 | — | — |
| diethanolamine | — | 0.6 | 0.6 |
| water | 2.5 | 2.5 | 2.5 |
| silicone cell control agent | 2.0[7] | 0.03[9] | 0.03[9] |
| triethylenediamine[3] | 0.4 | 0.86 | 0.86 |
| bis(2-dimethyl-aminoethyl) ether[4] | 0.13 | 0.1 | 0.1 |
| DMP + MEE[6] | 0.3 | — | — |
| dibutyl tin dilaurate | 0.01 | 0.043 | 0.043 |
| zinc octoate | 0.05 | — | — |
| isocyanate | 33.5[5] | 30.9[10] | 30.9[10] |
| NCO Index | 105 | 100 | 100 |
| Mold fill time, sec. | 62 | 53 | 52.5 |
| Density, lbs/ft$^3$ | 2.86 | 2.67 | 2.55 |
| (g/cc) | (0.046) | (0.043) | (0.041) |
| Tensile strength, psi | 23.2 | 13.1 | 17.4 |
| (kg/cm$^2$) | (1.63) | (0.92) | (1.22) |
| Tear resistance, lbs/in | 2.65 | 1.83 | 2.38 |
| (kg/cm) | (0.47) | (0.33) | (0.42) |
| Resiliency (D.B.) | 63 | 61 | 62 |
| 25% ILD | 31.5 | 20.2 | 21.0 |
| 65% ILD | 80.9 | 57.2 | 57.2 |
| Modulus | 2.57 | 2.83 | 2.72 |
| Air Flow, ft$^3$/min. | 3.1 | 1.9 | 1.7 |
| (m$^3$/min.) | (0.09) | (0.05) | (0.05) |
| % Shrinkage | 1.86 | 15.36 | 1.94 |

| | Example 12 | Comp. Exp. F | Example 13 | Comp. Exp. G |
|---|---|---|---|---|
| Polyol A | 70 | 70 | 37 | 37 |
| Polyol B[13] | 30 | 30 | — | — |
| Polyol C[14] | — | — | 63 | 63 |
| filler | 0.25[1] | — | 0.25[1] | — |
| isophorone diamine | 0.6 | 0.6 | 0.6 | 0.6 |
| diethanolamine | — | — | — | — |
| water | 2.5 | 2.5 | 2.5 | 2.5 |
| silicone cell control agent | 2.0[7] | 2.0[7] | 2.0[7] | 2.0[7] |
| triethylenediamine[3] | 0.21 | 0.21 | 0.21 | 0.21 |
| bis(2-dimethyl-aminoethyl) ether[4] | 0.13 | 0.13 | 0.13 | 0.13 |
| DMP + MEE[6] | 0.25 | 0.25 | 0.25 | 0.25 |
| dibutyl tin dilaurate | 0.007 | 0.007 | 0.007 | 0.007 |
| zinc octoate | 0.05 | 0.05 | 0.05 | 0.05 |
| isocyanate | 33.1[5] | 33.1[5] | 33.1[5] | 33.1[5] |
| NCO Index | 105 | 105 | 105 | 105 |
| Mold fill time, sec. | 57 | 57.5 | 58 | 58 |
| Density, lbs/ft$^3$ | 2.96 | 2.85 | 2.7 | 2.64 |
| (g/cc) | (0.047) | (0.046) | (0.043) | (0.42) |
| Tensile strength, psi | 20.9 | 21.2 | 21.7 | 20.4 |
| (kg/cm$^2$) | (1.47) | (1.49) | (1.53) | (1.43) |
| Tear resistance, lbs/in. | 2.07 | 2.16 | 2.14 | 1.92 |
| (kg/cm) | (0.37) | (0.39) | (0.38) | (0.34) |
| Resiliency (D.B.) | 66 | 64 | 68 | 55 |
| 25% ILD | 44.4 | 40.7 | 40.6 | 39 |
| 65% ILD | 117.8 | 109.9 | 103.6 | 103.6 |
| Modulus | 2.66 | 2.70 | 2.55 | 2.66 |
| Air Flow, ft$^3$/min. | 1.8 | 1.0 | 1.8 | 0.3 |
| (m$^3$/min.) | (0.05) | (0.03) | (0.05) | (0.01) |

TABLE I-continued

| % Shrinkage | 1.84 | 2.04 | 1.92 | 2.58 |
|---|---|---|---|---|

[1] The filler was silica treated as in A and having a pH of 6.5–7.5, a particle size of about 15 millimicrons and an agglomerated particle size of less than 2 microns.
[2] The filler was untreated silica having a pH of 5.5, a particle size of about 15 millimicrons and an agglomerated particle size of less than 2 microns commercially available from Cabot Corp. as Cab-O-Sil, grade M-5.
[3] A 33 weight % solution in dipropylene glycol
[4] A 70 weight % solution in dipropylene glycol
[5] The isocyanate blend was 90 weight % of an 80/20 mixture of 2,4-/2,6-toluene diisocyanate having an NCO equivalent weight of about 87 and 10 weight % of a polymethylene polyphenylisocyanate having an average functionality of about 2.8 and an NCO equivalent weight of about 134.
[6] A mixture of 26 weight % 1,4-dimethyl piperazine and 74 weight % bis(2-morpholino ethyl ether)
[7] The cell control agent was a non-hydrolyzable polysiloxane surfactant commercially available from Union Carbide Corp. as L-5303.
[8] The filler was silica treated as indicated in C with triethanolamine.
[9] The cell control agent was a non-hydrolyzable polysiloxane surfactant commercially available from Dow Corning Corp. as DCF 1 1630.
[10] The isocyanate was an 80/20 mixture of 2,4-/2,6-toluene diisocyanate
[11] The filler was carbon black having a pH of 8.5 and an average particle size of about 1 micron commerically available from Cabot Corp. as Sterling R Grade carbon black.
[12] The filler was silica having a pH of 7 and an effective particle size of 10 microns commercially available from Illinois Minerals Co.
[13] Polyol B is a 21 wt. % suspension of a copolymer of 48 wt. % styrene and 52 wt. % acrylonitrile in a 4800 molecular weight polyether triol commercially available from Union Carbide Corp. as Niax$^R$ 34-28.
[14] Polyol C is a 10 wt. % suspension of a copolymer of 60 wt. % styrene and 40 wt. % acrylonitrile in Polyol A said suspension being prepared by adding said copolymer to said polyol in the form of a latex (particle size = 2000 A) and removing the water by flashing at reduced pressure.

I claim:

1. A polyol containing from about 0.25 to about 10.0 percent by weight of an inorganic filler having a pH from about 6.5 to about 8, and an average effective particle size of less than 7 microns, wherein said polyol is selected from the group consisting of (A) polyether diols and triols having an average hydroxyl equivalent weight of from about 900 to about 2500, (B) polyester diols having an average hydroxyl equivalent weight of from about 900 to about 2500 and (C) mixtures thereof.

2. The polyol of claim 1 wherein said inorganic filler is present in quantities of from about 2.5 to about 3.5 percent by weight and has a pH of from about 7 to about 8 and an average effective particle size of less than about 2.5 microns and wherein said polyol is a polyether polyol.

3. The polyol of claim 2 wherein said inorganic filler is silica.

4. The polyol of claim 3 wherein said inorganic filler is carbon black.

* * * * *